United States Patent
Zhang et al.

(10) Patent No.: US 10,156,901 B2
(45) Date of Patent: Dec. 18, 2018

(54) TOUCH SURFACE FOR MOBILE DEVICES USING NEAR FIELD LIGHT SENSING

(71) Applicant: Wisconsin Alumni Research Foundation, Madison, WI (US)

(72) Inventors: Xinyu Zhang, Madison, WI (US); Chi Zhang, Madison, WI (US); Joshua Tabor, Madison, WI (US); Jialiang Zhang, Madsion, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 244 days.

(21) Appl. No.: 14/885,490

(22) Filed: Oct. 16, 2015

(65) Prior Publication Data

US 2017/0108994 A1    Apr. 20, 2017

(51) Int. Cl.
*G06F 3/01* (2006.01)
*G06F 3/041* (2006.01)
*G06F 3/042* (2006.01)
*G06F 3/0354* (2013.01)

(52) U.S. Cl.
CPC .......... *G06F 3/014* (2013.01); *G06F 3/03547* (2013.01); *G06F 3/0418* (2013.01); *G06F 3/0428* (2013.01); *G06F 2203/04103* (2013.01)

(58) Field of Classification Search
CPC ...... G06F 3/0421; G06F 3/014; G06F 3/0418; G06F 3/0488
See application file for complete search history.

(56) References Cited

U.S. PATENT DOCUMENTS

| 6,611,252 B1* | 8/2003 | DuFaux | G06F 3/0421 345/168 |
| 6,760,009 B2 | 7/2004 | Omura et al. | |
| 2003/0080976 A1* | 5/2003 | Satoh | G06F 3/014 345/629 |
| 2010/0295821 A1* | 11/2010 | Chang | G06F 3/0421 345/175 |
| 2012/0162144 A1* | 6/2012 | Fahraeus | G06F 3/0418 345/178 |

(Continued)

OTHER PUBLICATIONS

Samuel David Perli et al.; "Pixnet: interference-free wireless links using lcd-camera pairs," In Proceedings of the sixteenth annual international conference on Mobile computing and networking, pp. 137-148. ACM, 2010, USA.

(Continued)

*Primary Examiner* — Chun-Nan Lin
(74) *Attorney, Agent, or Firm* — Boyle Fredrickson, S.C.

(57) ABSTRACT

A virtual touchscreen for mobile devices provides a touchscreen area displaced to a side of the display to eliminate problems of a finger blocking the display during normal touchscreen operation. The virtual touchscreen may be monitored by a sensor system looking edgewise from a housing of the mobile device employing as few as two displaced photodetectors and a correspondingly oriented light source constrained to sensitivity within a narrow fan-shaped light-sensing plane. Extraction of the spatial location of a finger touch within this touchscreen area may be performed by a model of reflected light signals of a finger in different locations calibrated to environmental parameters of finger reflectivity and background reflectivity by a simple calibration process.

19 Claims, 4 Drawing Sheets

(56) References Cited

U.S. PATENT DOCUMENTS

| | | | | |
|---|---|---|---|---|
| 2013/0194199 | A1* | 8/2013 | Lynch | G06F 3/0412 345/173 |
| 2014/0240267 | A1* | 8/2014 | Luo | G06F 3/0418 345/173 |
| 2015/0227261 | A1* | 8/2015 | Huang | G06F 3/0421 345/175 |
| 2015/0323998 | A1* | 11/2015 | Kudekar | G06F 1/163 345/156 |

OTHER PUBLICATIONS

Tian Hao et al.; "Cobra: color barcode streaming for smartphone systems." cse.msu.edu of—In Proceedings of the 10th international conference on Mobile systems, applications, and services, pp. 1-14. ACM, 2012. USA.

Alex Butler et al.; "SideSight: multi-touch interaction around small devices." In Proceedings of the 21st annual ACM symposium on User interface software and technology, pp. 201-204. ACM, 2008. UK.

Liqun Li et al.; "Epsilon: A visible light based positioning system." In 11th USENIX Symposium on Networked Systems Design and Implementation (NSDI 14), pp. 1-13. USENIX Association, 2014. CN.

Ye-Sheng Kuo et al.; "Luxapose: Indoor positioning with mobile phones and visible light." In Proceedings of the 20th annual international conference on Mobile computing and networking, pp. 447-458. ACM, Sep. 2014. HI, USA.

Sridhar Rajagopal et al.; "IEEE 802.15. 7 visible light communication: modulation schemes and dimming support." Communications Magazine, IEEE 50, No. 3 (Mar. 2012): 72-82, USA.

Junjue Wang et al.; "Ubiquitous keyboard for small mobile devices: harnessing multipath fading for fine-grained keystroke localization." In Proceedings of the 12th annual international conference on Mobile systems, applications, and services, pp. 14-27. ACM, 2014. USA.

Sandip Agrawal et al.; "Using mobile phones to write in air." In Proceedings of the 9th international conference on Mobile systems, applications, and services, pp. 1-14. ACM, 2011. USA.

Jue Wang et al.; "RF-IDraw: virtual touch screen in the air using RF signals." In Proceedings of the 2014 ACM conference on SIGCOMM, pp. 235-246, ACM, Aug. 17-22, 2014, Illinois, USA.

Tobias Grosse-Puppendahl et al.; "Capacitive near-field communication for ubiquitous interaction and perception." In Proceedings of the 2014 ACM International Joint Conference on Pervasive and Ubiquitous Computing, pp. 231-242. ACM, Sep. 13-17, 2014. WA, USA.

Mathieu Le Goc et al.; "A low-cost transparent electric field sensor for 3d interaction on mobile devices." IProceedings of the 2014 Annual Conference on Human Factors in Computing Systems (CHI 2014). Apr. 2014, pp. 3167-3170. ACM, Toronto, Canada.

Chris Harrison et al.; "Skinput: appropriating the body as an input surface." In Proceedings of the SIGCHI Conference on Human Factors in Computing Systems, pp. 453-462. ACM, Apr. 10-15, 2010. GA, USA.

Robert Xiao et al.; "Lumitrack: low cost, high precision, high speed tracking with projected m-sequences." In Proceedings of the 26th annual ACM symposium on User interface software and technology, pp. 3-12. ACM, Oct. 8-11, 2013. UK.

David Kim et al. "RetroDepth: 3D silhouette sensing for high-precision input on and above physical surfaces." In Proceedings of the 32nd annual ACM conference on Human factors in computing systems, pp. 1377-1386. ACM, Apr. 26-May 1, 2014. Toronto, ON, Canada.

Lin Edwards; Mouseless, the 'invisible' computer mouse; APA citation; PhysOrg.com; pp. 1-2; Jul. 8, 2010, USA.

Eric Larson et al.; "HeatWave: thermal imaging for surface user interaction." In Proceedings of the SIGCHI Conference on Human Factors in Computing Systems, pp. 2565-2574. ACM, May 7-12, 2011. Vancouver, BC, Canada.

Alireza Sahami Shirazi et al.; "Exploiting thermal reflection for interactive systems." In Proceedings of the 32nd annual ACM conference on Human factors in computing systems, pp. 3483-3492. ACM, Apr. 26-May 1, 2014. Toronto, ON, Canada.

Juan Pablo Wachs et al.; "Vision-base land-gesture applications." Communications of the ACM, Vol, 54, No. 2 (Feb. 2011): pp. 60-71. USA.

Shenwei Liu et al.; "FlexAura: a flexible near-surface range sensor." In Proceedings of the 25th annual ACM symposium on User interface software and technology, pp. 327-330, ACM, Oct. 7-10, 2012. MA, USA.

Jungsoo Kim et al.; "The gesture watch: A wireless contact-free gesture based wrist interface." In Wearable Computers, 2007 11th IEEE International Symposium on, pp. 15-22. IEEE, 2007. USA.

Jon Moeller et al.; "ZeroTouch: an optical multi-touch and free-air interaction architecture." In Proceedings of the SIGCHI Conference on Human Factors in Computing Systems, pp. 2165-2174. ACM, May 5-10, 2012. TX, USA.

Sven Kratz et al.; "Hoverflow: exploring around-device interaction with IR distance sensors," MobileHCI'09 ACM 978-1-60558-281-8; pp. 1-4; Sep. 15-18, 2009, Bonn, Germany.

Chris Harrison et al.; "Abracadabra: wireless, high-precision, and unpowered finger input for very small mobile devices," In Proceedings of the 22nd annual ACM symposium on User interface software and technology, pp. 121-124. ACM, Oct. 4-7, 2009, Victoria, BC, Canada.

Masa Ogata et al.; "iRing: Intelligent ring using infrared reflection." In Proceedings of the 25th annual ACM symposium on User interface software and technology, pp. 131-136. ACM, Oct. 7-10, 2012, MA, USA.

* cited by examiner

TOUCH SURFACE FOR MOBILE DEVICES USING NEAR FIELD LIGHT SENSING

STATEMENT REGARDING FEDERALLY SPONSORED RESEARCH OR DEVELOPMENT

This invention was made with government support under CNS1318292, CNS1343363, CNS1350039, and CNS1404613 awarded by the National Science Foundation. The government has certain rights in the invention.

CROSS REFERENCE TO RELATED APPLICATION

Background of the Invention

The present invention relates to human machine interfaces and in particular to a touch type interface suitable for providing input to compact mobile devices.

Mobile devices are shrinking in size for improved portability; however, this reduction in size makes receiving user input increasingly difficult. The transition from desktop and laptop computers to tablet type devices and cell phones has been largely managed by the introduction of touchscreens which allow shared use of the display surface as an input surface.

Particularly for smaller devices, including wristwatches, this dual use of the display as an input surface can become a problem as the user's finger obscures increasingly larger portions of the area of the display being manipulated.

SUMMARY OF THE INVENTION

The present invention provides a virtual touch screen displaced to unused space to the side of the display of the device. Photosensors and at least one light source detect and project light respectively along a light-sensing plane extending from the housing of the device and defining the virtual touch screen area. The edgewise orientation of the sensing system to the virtual touch screen area allows the sensor system to be easily incorporated into the frame around the display for convenient simultaneous access to the display and virtual touch screen.

Specifically, the present invention provides a human interface device having a housing supporting a graphics display screen positionable against a surface. At least two photodetectors supported by the housing receive light along a light-sensing plane substantially parallel to the surface and extending away from the housing over an area offset from the housing and at least one light source projects light along the light-sensing plane. An electronic computer communicates with the photodetectors and light source and executes a program stored in non-transitory medium to: (1) independently measure light signals indicating light received by the photodetectors reflected from the light source off a finger within the light-sensing plane; (2) apply values of the light signals to a model converting the light signals to orthogonal coordinates defining points within the light-sensing plane; and (3) control an output on the graphics display screen according to the coordinates.

It is thus a feature of at least one embodiment of the invention to provide a sensing system providing an improved touchscreen experience by removing the point of touch from the display without substantially increasing the size of the device to support a touchpad or the like.

The graphics display screen may provide a display surface parallel to the light-sensing plane.

It is thus a feature of at least one embodiment of the invention to provide an extremely simple interface for convenient use when the housing is resting flat on a surface.

The housing may provide a greatest dimension along the display surface and a narrowest dimension perpendicular to the display surface and the light-sensing plane is positioned within the narrowest dimension.

It is thus a feature of at least one embodiment of the invention to provide an interface whose hardware components can be incorporated in the edge of the device without substantially increasing the housing size.

The housing may be sized to fit atop of an average human wrist and may include a wrist strap for attaching the housing to the wrist in the manner of a wristwatch.

It is thus a feature of at least one embodiment of the invention to provide a touchscreen interface for watch-size type devices where a finger touch substantially obscures the display.

The housing may provide a frame surrounding the graphics display screen to support the graphics display screen face upward and parallel to the surface during use.

It is thus a feature of at least one embodiment of the invention to provide an interface that can work with tablet-type devices when resting on a table with the display upward.

The device may include a collimator collimating the light from fan-shaped acquisition regions in the light-sensing plane onto each of the photodetectors, the fan-shaped acquisition regions each having a widest dimension aligned along the light-sensing plane.

It is thus a feature of at least one embodiment of the invention to improve sensitivity of the interface by reducing extraneous light received outside of the light-sensing plane.

The fan-shaped acquisition region may have a width measured in the light-sensing plane with at least 20 times the height of the fan measured perpendicularly to the light-sensing plane.

It is thus a feature of at least one embodiment of the invention to provide a sensing region that closely mimics a touch surface.

The device may further include a collimator forming the light from the LED into a fan shape having its widest dimension aligned along the light-sensing plane.

It is thus a feature of at least one embodiment of the invention to provide improved sensitivity by reducing scattered light off of services outside of the light-sensing plane.

The fan shape may have a width measured in the light-sensing plane with at least 20 times the height of the fan measured perpendicularly to the light-sensing plane.

It is thus a feature of at least one embodiment of the invention to provide a collimation pattern for the light which closely matches that of the photodetectors.

The output controls an image location on the graphics display screen or may control a virtual keyboard for entering characters on the graphics display screen.

It is thus a feature of at least one embodiment of the invention to provide common interface controls needed for electronic devices.

The motion of the image may have the same orientation as motion of the finger within the light-sensing plane.

It is thus a feature of at least one embodiment of the invention to provide intuitive operation despite displacement of the control surface from the screen.

The electronic computer may monitor the measured signals to deduce a presence or absence of the finger to control output on the graphics display according to the presence or absence of the finger in the light-sensing plane.

It is thus a feature of at least one embodiment of the invention to provide touch sensing in addition to spatial discrimination.

The electronic computer may further determine a background signal level when a finger is not within the light-sensing plane and compensate the measured light signals according to that measured background signal.

It is thus a feature of at least one embodiment of the invention to enable edgewise sensing despite variation in background surfaces.

The light source may be modulated and light signals from the photodetector demodulated to reject ambient light not subject to the modulation.

It is thus a feature of at least one embodiment of the invention to permit operation of the device in a variety of environments subject to ambient lighting.

The modulation duty cycle of the light source may be decreased when a finger presence is not detected.

It is thus a feature of at least one embodiment of the invention to provide a power efficient design compatible with battery-operated devices.

The electronic computer may further execute to receive measured light signals during a predefined path of motion of a finger within the light-sensing plane to calibrate the model.

It is thus a feature of at least one embodiment of the invention to provide improved performance of the interface through a simple calibration process.

The model may be calibrated to an arbitrary area defined by the predetermined path of motion of the finger.

It is thus a feature of at least one embodiment of the invention to provide a modeling process that does not require precise finger movement by the individual.

The model may include corrections for angular sensitivity variation of the photodetectors within the light-sensing plane and angular sensitivity variations of the LED light output within the light-sensing plane.

It is thus a feature of at least one embodiment of the invention to operate with conventional photodetector and light sources subject to angular variation.

These particular objects and advantages may apply to only some embodiments failing within the claims and thus do not define the scope of the invention.

DETAILED DESCRIPTION OF THE PREFERRED EMBODIMENT

Figure 1:
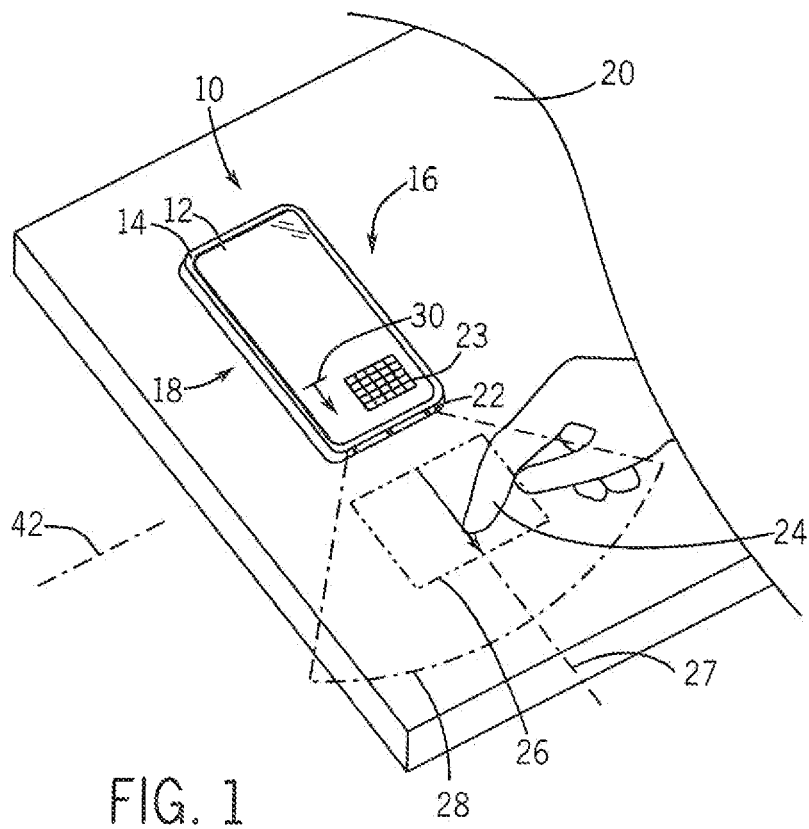
FIG. 1 is a perspective view of a portable device supported on a table surface or the like providing a virtual touchscreen per the present invention, the virtual touchscreen displaced from the display area of the device.

Referring now to FIG. 1, a portable device 10, such as a tablet or cell phone or the like, may provide for a graphics display screen 12, for example, an LCD display with or without touchscreen capabilities surrounded by a frame 14 such as form part of a housing 16 for the graphics display screen 12 and other electronics incorporated within the portable device 10 as will be described below.

The housing 16 may provide for a rear face 18 that may be placed against an upper horizontal surface 20 of the table or the like to support the device 10 such that the graphics display screen 12 has its broad face exposed upwardly and generally parallel to a upper surface 20 of the table to be visible to the user.

One embodiment of the invention provides a sensor system 22 incorporated into the frame 14 and operating to sense motion of a user's finger 24 moving within a virtual touchscreen area 26 offset from the frame 14 along an axis 27. Axis 27 may in one embodiment be generally in a parallel plane to a plane of the display area of the graphics display screen 12 so that the virtual touchscreen area 26 is positioned over an unoccupied portion of the upper surface 20. The sensor system 22 will be generally sensitive to light within a light-sensing plane 28 extending edgewise from the frame 14 and aligned with and subtending the virtual touchscreen area 26.

As will be discussed below, movement of the user's finger 24 within the virtual touchscreen area 26 may be detected by the sensor system 22 to control output on the graphics display screen 12, for example, the movement of an image 30 of a cursor or the like, to track movement of the user's finger 24 within the virtual touchscreen area 26 mapped to the area of the graphics display screen 12. For a tablet-type device 10, the virtual touchscreen area 26 may, for example, be nine centimeters by seven centimeters.

Figure 2:
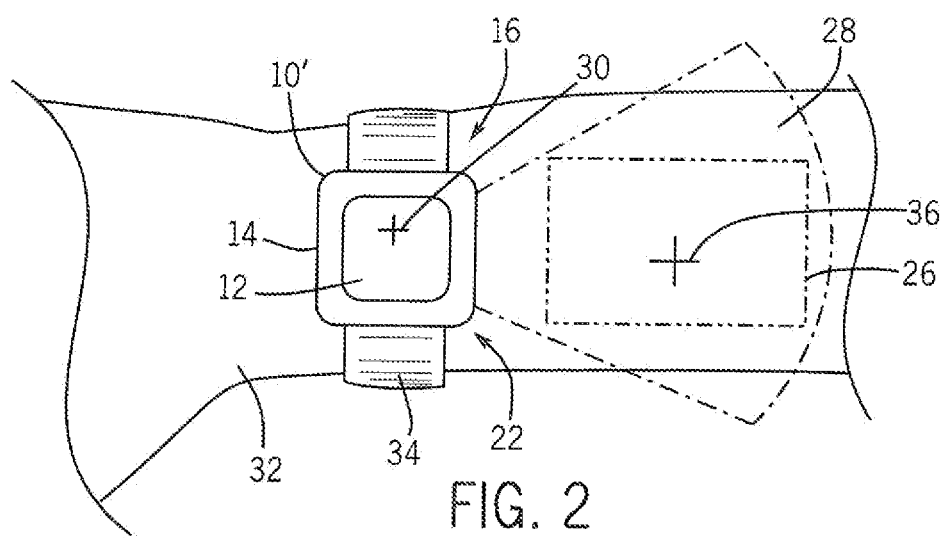
FIG. 2 is a perspective view of a wrist mounted portable device in which the virtual touchscreen is displaced from the display over the user's wrist.

Referring now to FIG. 2, the same concept can be applied to a device 10' in the form factor of a wristwatch also having a graphics display screen 12 surrounded by a frame 14 being part of a housing 16. In this case the housing 16 may be attached to the upper side of the user's wrist 32, for example, held by a wrist strap 34 in the manner of a conventional wristwatch, so that the graphics display screen 12 is visible like the face of a wristwatch. The sensor system 22, in this case, may monitor a light-sensing plane 28 extending back along the upper surface of the user's wrist 32 toward the user's elbow to define a virtual touchscreen area 26 over the unoccupied area of the surface of the user's forearm.

In either embodiment of FIG. 1 or 2, the user may touch a location 36 within the virtual touchscreen area 26 with a finger 24 of the user's other hand to control the graphics display screen 12, for example, an image 30 of a cursor as discussed above, and/or to provide input to the device 10, 10', for example, by touching locations 36 which map to key buttons of a keyboard image 23 on the graphics display screen 12 (shown in FIG. 1) providing keyboard-type entry. Generally the movement, for example, of an image 30, will track movement of the location 36 in orientation (e.g., left movement of the image 30 will correspond the left movement of the location 36) and in translation by a fixed scale factor relating the size of the graphics display screen 12 to the size of the virtual touchscreen area 26.

Figure 3:
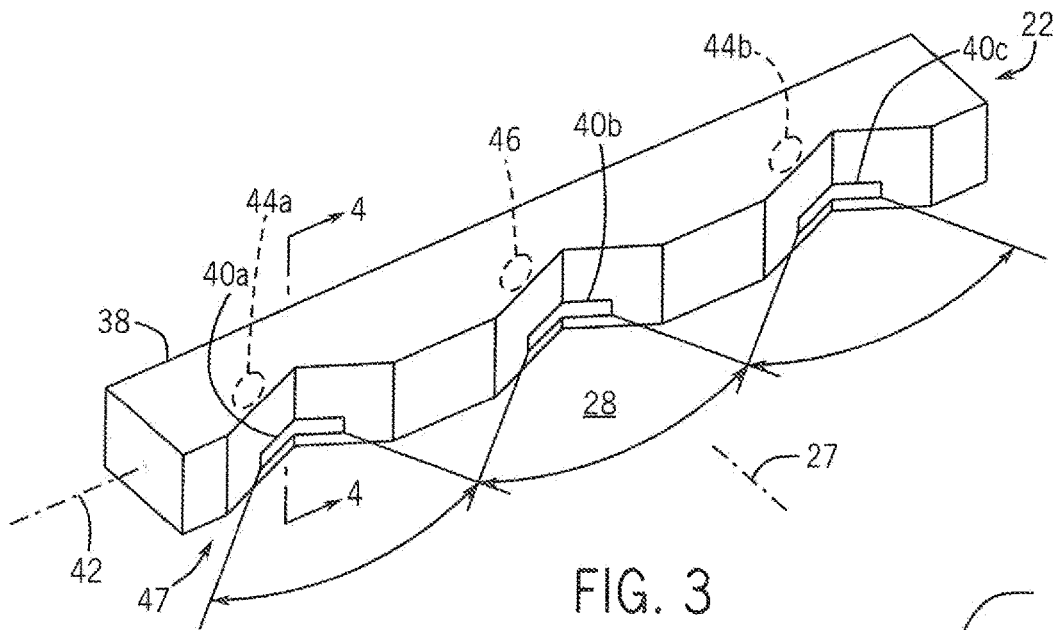
FIG. 3 is a perspective view of a sensor system for use with the present invention showing a light shroud for use in collimation.

Referring now to FIG. 3, the sensor system 22 in one embodiment may provide for a sensor housing 38 providing three apertures 40*a*-40*c* displaced along an axis 42 perpendicular to axis 27 and together with axis 27 defining a plane generally parallel to the plane of the virtual touchscreen area 26. Ideally, the separation of apertures 40*a* and 40*c* will be maximized within the space constraints of the frame 14 to provide for maximum resolution in the virtual touchscreen area 26 with aperture 40*b* positioned approximately midway between apertures 40*a* and 40*c*.

Behind each of apertures 40*a* and 40*c* are left and right photodetectors 44*a* and 44*b*, respectively, positioned to receive light through the apertures 40*a* and 40*c* from the light-sensing plane 28. Behind aperture 40*c* is a light source 46, for example, a light emitting diode in the near infrared frequency range positioned to project light through the aperture 40*b* along the light-sensing plane 28.

Figure 4:
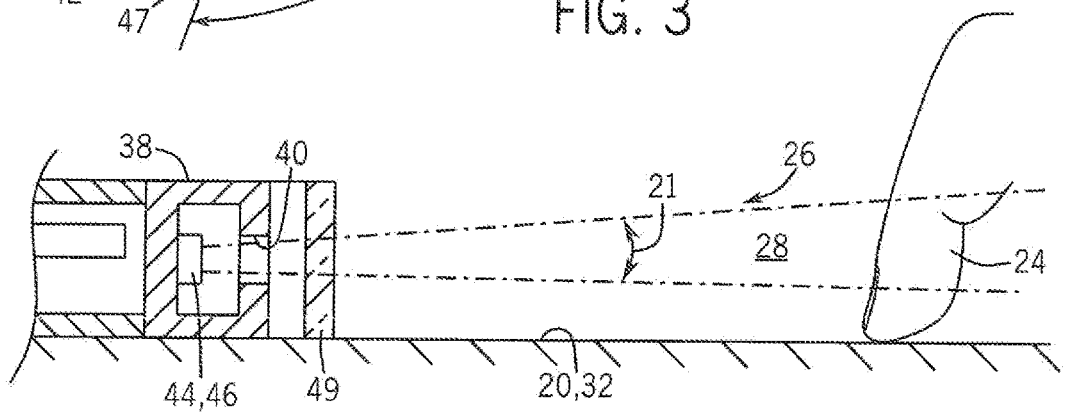
FIG. 4 is an elevational cross-section showing the operation of the shroud in providing a light grooming producing a limited height, light-sensing plane.

In one embodiment of the sensor housing 38, the sensor housing 38 may provide for a collimating shroud around the apertures 40 to provide for light "grooming" of both of the light projected by the light source 46 and the light received by the photodetectors 44*a* and 44*b* within a relatively thin light-sensing plane 28 extending fanlike across the virtual touchscreen area 26. In this respect, the shroud formed by the housing 38 may provide for a V-notch 47 for each of the apertures 40, for example, having an angular extent of 90 degrees within the light-sensing plane 28, thereby limiting the angular extent of the light-sensing plane 28. Similarly, and referring also to FIG. 4, the shroud provided by the housing 38 may likewise constrain a vertical width 21 of the light-sensing plane 28, for example, to a few degrees measured perpendicularly to the light-sensing plane 28 and less than 10 degrees.

This light grooming allows better rejection of unwanted light and reflections that might detrimentally affect detection of the finger 24 in the virtual touchscreen area 26. The light grooming also allows the finger 24 to be easily removed from and inserted into the sensing region defined by the light-sensing plane 28. Detection of the presence of the finger 24 as well as its spatial location allows not only finger position to be determined within the virtual touchscreen area 26 but also a touch "event" occurring at the introduction of the finger into the virtual touchscreen area 26 with slight movement of the finger toward the surface 20 or the back of the wrist 32. A touch event may provide for an input signal similar to a mouse "click" or the touch of a touchscreen.

In some embodiments an infrared filter 49 may be placed over the apertures 40*a* and 40*b* to limit the effect of bright daylight in possibly saturating the photodetectors 44 or otherwise interfering with the measurement of the photodetectors 44. Other saturation prevention techniques may also be used, for example, including an actively controlled LCD shutter or, for wide dynamic range photodetectors 44, a change in bias voltage or amplification of the signals received from the photodetectors 44.

Figure 5:
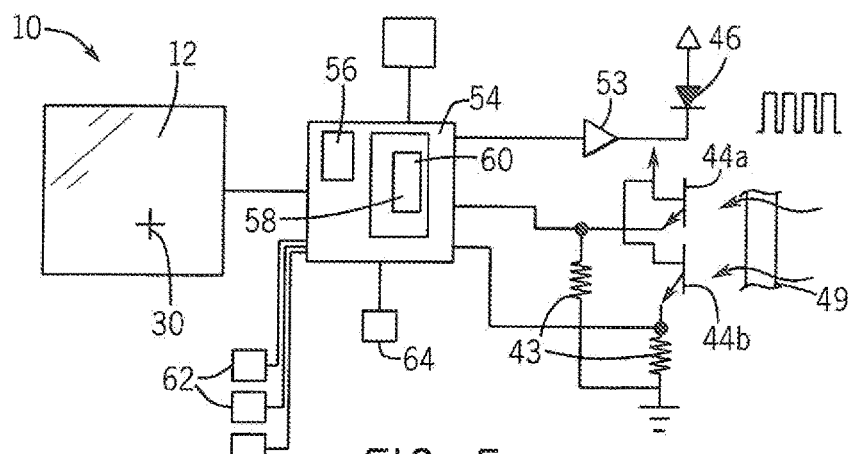
FIG. 5 is a block diagram of the sensing system of FIG. 3 as communicating with a processor of the device and the display screen.

Referring momentarily FIG. 5, it will be appreciated that in an alternative embodiment light-sensing or light-emitting elements 50 associated with either the photodetectors 44 or light source 46 may include an anamorphic lens 52 and opaque stops 55 to provide similar light grooming as described above while improving the sensitivity of the system by reducing light blocking in the grooming process. Generally the anamorphic lens 52 will provide for an expansion of a field of view along axis 42 relative to the field of view perpendicular to axis 42 and axis 27. The anamorphic lens 52 and opaque stops 55 may be formed into a package integrated with the light-sensing or light-emitting elements 50.

Referring no to FIG. 5, light source 46 may be driven by a driver circuit 53 under the control output of a microcontroller 54 to modulate the light from the light source 46, for example, using on-off keying (OOK) at a switching, rate of about 30 hertz, much faster than the typical variation of ambient light sources. Light sensed from either photodetector 44*a* or photodetector 44*b* (for example, being photo transistors) may be measured from base resistances 43 attached to the emitters of the transistors and further received by an analog-to-digital converter in the microcontroller 54. This light may be synchronously or asynchronously demodulated at the switching rate and phase to discriminate against ambient light that is not so modulated.

Referring still to FIG. 5, the microcontroller 54 may include one or more processors 56 communicating with electronic memory 58 holding a stored program 60 executable by the processors 56 as will be discussed below. Generally, the microcontroller 54 may also communicate with the graphics display screen 12 to provide images thereon associated with the sensing of the present invention. The microcontroller 54 may also communicate with various electronic interfaces 62 such as pushbuttons, microphones, accelerometers, gyroscopes and the like, well known in portable devices.

When the portable device 10 is a cell phone or the like, the microcontroller 84 may also communicate with wireless communications circuits 64 such as those providing for Wi-Fi, Bluetooth, and cell phone communication as well as GPS communication circuits for GPS navigation.

Figure 6:
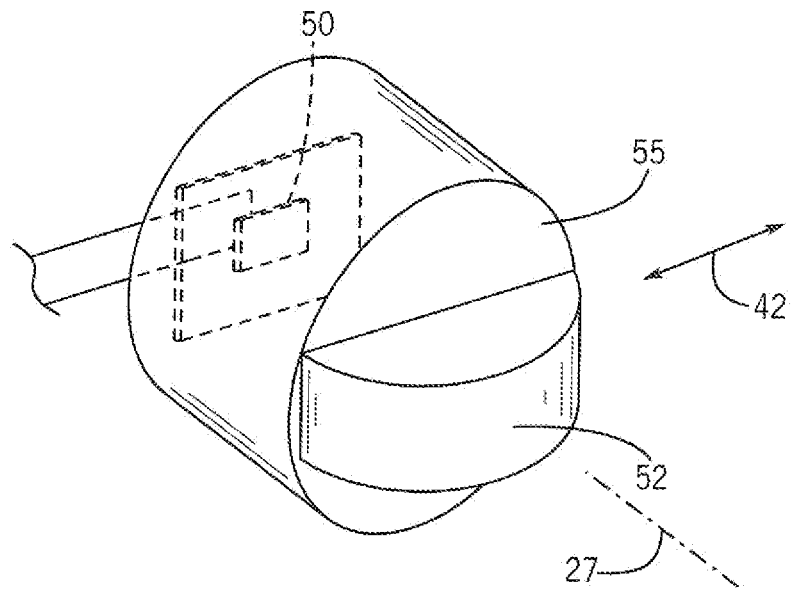
FIG. 6 is an alternative collimation system incorporating anisotropic lenses in the photodetector and light source.
Figure 7:
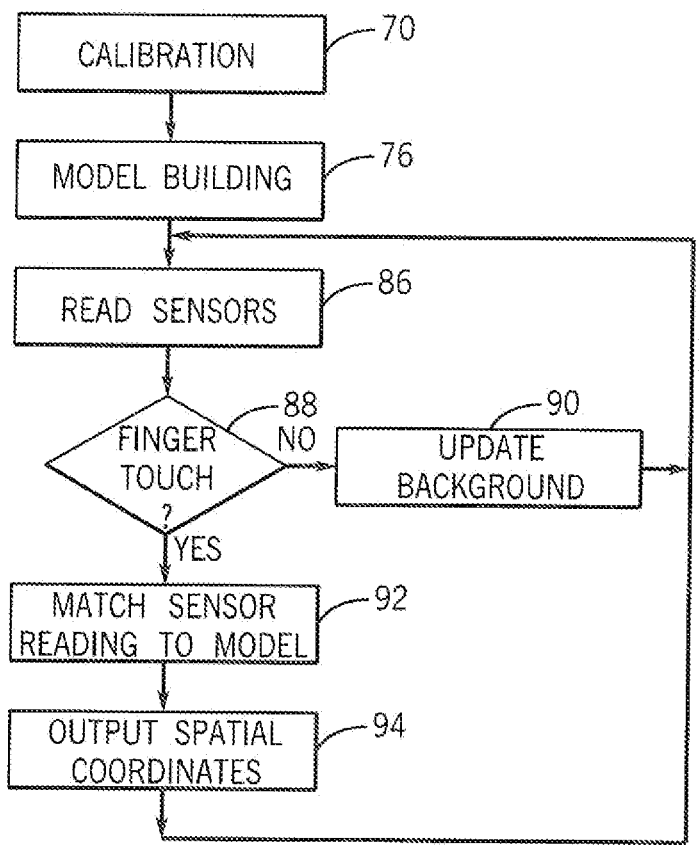
FIG. 7 is a flowchart executed by the processor FIG. 5 in deriving finger touch position.

Referring now to FIGS. 1 and 6, the present invention may be activated by the user, for example, using a variety of input methodologies including electronic interfaces 62 or even the sensor system 22 detecting a momentary finger touch. At this time, as indicated by process block 70, a calibration may be performed and calibration input indicated by process block 70. This calibration input is intended to calibrate the sensor system 22 to environmental variables such as background reflection and ambient light. Specifically, these environmental variables include variations in finger reflectivity from different individuals (including that caused by skin differences and finger sizes) and workspace related parameters such as surface reflectivity of the surface 20. In one embodiment, the calibration process may instruct the user to insert his or her finger 24 into the light-sensing plane 28 at a beginning of the virtual touchscreen area 26 along axis 27 and then to move his or her finger 24 generally along axis 27 from a beginning of the virtual touchscreen area 26 to an end of the virtual touchscreen area 26 and then to lift the user's finger out of the light-sensing plane 28. In one embodiment, the user may be instructed to move a precise distance; however, the calibration system may readily accommodate variations in this distance by simply scaling the virtual touchscreen area 26 appropriately to whatever distance the user moves.

Figure 8:
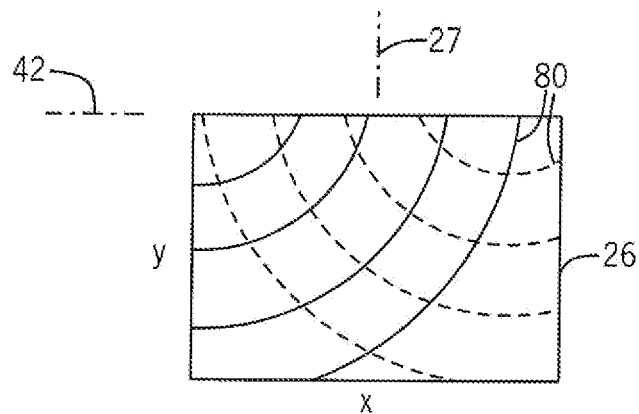
FIG. 8 is a contour plot of signal strength from the left and right photodetectors showing unique intersections of the curve from each photodetector allowing a functional mapping between signal strength and spatial location forming the basis of a model.

Referring now to FIG. 8, during this calibration procedure, for each photodetector 44, a signal 72 will be detected being reflectance from the light source 46 generally declining with time after an initial increase with a finger insertion at time $t_i$ within the light-sensing plane 28 until a finger extraction at time $t_e$. This signal may be generally modeled for each photodetector 44 as a combination of a variety of factors according to the equation:

$$RSS = C g_t g_d S_{PD}(\theta_r) S_{LED}(\theta_t) \quad (1)$$

where:

RSS is the measured signal strength (respectively for the photodetectors 44a and 40b);

C is an environmental calibration factor incorporating finger reflectivity and work surface reflectivity discussed above to be determined through the calibration process;

$g_t$ is a falloff in light intensity from the light source 46 generally observing the inverse square law and will be a function of finger position;

$g_d$ is a falloff in light intensity detected by the photodetectors 44 generally being an inverse linear relationship caused by a change in the finger's visible height with distance and will be a function of finger position;

$S_{PD}(\theta_r)$ is an angular variation of the sensitivity of the individual photodetector 44 with an angle in the light-sensing plane 28 and will be a function of finger position; and $S_{LED}(\theta_t)$ is an angular variation in light output from the light source 46 within the light-sensing plane 28 and will be a function of finger position.

It will be appreciated that $S_{PD}(\theta_r)$ and $S_{LED}(\theta_t)$ may be subject to factory determination being intrinsic properties of the photodetectors 44 and light source 46 and the collimation provided as discussed above. The values of $g_t$ and $g_d$ maybe separately determined for each point of the signal 72 between $t_i$ and $t_e$ (and these values averaged together) assuming constant finger motion between entry and exit from the light-sensing plane 28. The finger position values used for these values of $g_t$ and $g_d$ for each photodetector 44 may be based on actual measured distances or normalized to a reference frame of an arbitrarily sized virtual touchscreen area 26 defined by the normalized distance between the user's insertion and removal of his or her finger 24 from the light-sensing plane 28. That is, the user may size the virtual touchscreen area 26 during the calibration process. The slope of the signal 72 may then indicate the value of C for each of the photodetectors 44a and 44b separately lumping together the environmental considerations discussed above. Generally, the threshold 74 of signal RSS before time $t_i$ and after time $t_e$ may be used to determine background values that may be used to provide an indication of when a finger is and is not in the region as will be used and discussed above.

Figure 9:
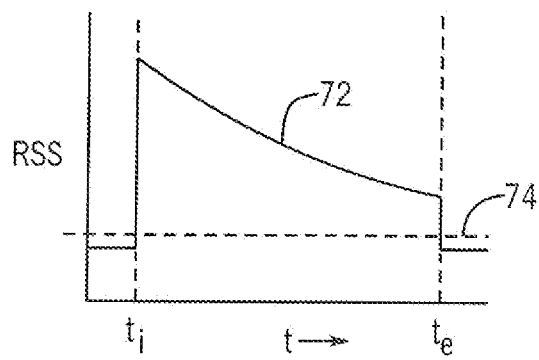
FIG. 9 is a plot against time of the signal from one photodetector during a calibration procedure allowing adjustment of the model to particular environmental parameters.
Figure 10:
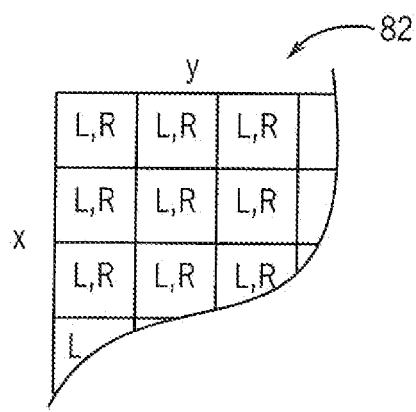
FIG. 10 is a simplified representation of a model implemented as a lookup table giving pairs of signal strength from the left and right photodetector.

As indicated by process block 76, the values of equation (1) discussed above may be used to create a model relating the signals detected by each of the photodetectors 44a and 44b as a function of an x and y Cartesian location of a finger touch in the virtual touchscreen area 26 where y is measurement along axis 27 and x is a measurement along axis 42. In principle, the model takes the measured values of RSS for the photodetectors 44a and 44b and determines x and y values that would satisfy equation (1). Generally, RSS isostrength lines 80 from a contour plot generated by equation (1) for one photodetector 44a will have only one intersection with isostrength lines of the other photodetector 44b allowing each location (x, y) to be mapped to a unique pair of RSS values that may be stored in a lookup table 82 shown in FIG. 9 schematically and stored in the memory 58 of the microcontroller 54 (shown in FIG. 5) as a table built per process blocks 76. This lookup table 82 avoids the need for complex real-time calculations; however, such calculations can be a viable alternative to look up table storage.

In one embodiment, the model is used to compute a look-up table that maps every location spot on 1 mm×1 mm grid into an RSS pair. At run-time, the program can look for the RSS pair that matches closely with its measured one, and then reverse it to a location spot. The error metric for matching can be either Euclidean distance or Manhattan distance.

Each entry in the lookup table 82 includes a pair of measurements of RSS and are related to specific spatial locations x and y by a column and row of the table 82, for example, each column and row representing a successive displacement by a given distance, for example, in absolute millimeters or m percentages of the size of the virtual touchscreen area 26.

Additional detail in one embodiment of building this table is described in the published paper "Extending Mobile Interaction through Near-Field Visible Light-sensing" by Chi Zhang, Joshua Tabor, Jialiang Zhang and Xinyu Zhang, publishing conjunction with MobiCom '15, Sep. 7-11 2015, Paris France ACM ISBN 978-1-4503-3543-0/15/09 hereby incorporated in its entirety in the present application together with the references cited therein.

It will also be appreciated that this model may be developed empirically by using a set of calibrated finger phantoms moved within the virtual touchscreen area 26 and the calibration process used to select among the different empirically developed submodels by a closest fit process.

Referring again to FIG. 6, at process block 86 sensor signals are periodically acquired from the photodetectors 44a and 44b with activation of the light source 46, and at decision block 88 the acquired signals are evaluated to determine whether a finger touch is present (that is the user's finger 24 newly arriving within the light-sensing plane 28). In the simplest embodiment, a finger touch may be determined by measurement signals that exceed a threshold 74 determined during calibration by a fixed given percentage. Other more sophisticated techniques such as the "Temporal Background Modeling" approach described in the above referenced paper may be used.

If a finger touch is not detected, the program may proceed to process block 90 and the background level 74 updated in preparation for a next reading of sensor signals at process block 86. If a finger touch is detected at decision block 88 then the values of the signals detected by the photodetectors 44a and 44b are applied to the table 82 to find a closest match and that closest match value mapped to x and y coordinates per process block 92.

At process block 94 this position information together with the implicit touch information of decision block 88 may be used in another application program (for example, by a touchscreen-emulating driver) to control the output on the graphics display screen 12 (shown in FIG. 1 or 2), for example, by moving a cursor or moving an underlying image selecting among multiple virtual buttons displayed on the graphics display screen 12 or identifying a key of the virtual keyboard that has been pressed. Selection of a particular key may be determined, for example, through a two-step process in which a spatial location is determined per table 82 of FIG. 9 and that spatial location identified to a closest key based on the keyboard's geometrical outline of each key. A keypress may be determined by a touch event occurring contemporaneously with the spatial location.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The term orthogonal is intended to mean independent and is not limited to perpendicular coordinates but would include coordinates such as polar coordinates or the like. Non-transitory medium should be understood to exclude any program storage elements not meeting the statutory requirements of 35 USC § 101.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A human interface device comprising:
   a housing supporting a graphics display screen positionable against a surface;
   at least two photodetectors supported by the housing to receive light along a light-sensing plane extending away from the housing over an area offset from the housing, the at least two photodetectors each receiving light from over a common region of the light-sensing plane and each producing a corresponding light-strength signal being a function of light received from over the common region of the light-sensing plane;
   at least one light source to project light along the light-sensing plane; and
   an electronic computer communicating with the at least two photodetectors and the at least one light source and executing a program stored in non-transitory medium to:
   (1) independently measure the light strength signals reflected from the at least one light source off a finger within the light-sensing plane;
   (2) apply values of the light strength signals to a model relating strength of the light strength signals to a distance between the finger and the given one of the at least two photodetectors and converting the distances to orthogonal coordinates defining points within the light-sensing plane; and
   (3) control an output on the graphics display screen according to the orthogonal coordinates.

2. The human interface device of claim 1 wherein the graphics display screen provides a display surface parallel to the light-sensing plane.

3. The human interface device of claim 2 wherein the housing provides a greatest dimension along the display surface and a narrowest dimension perpendicular to the display surface and wherein the light-sensing plane is positioned within the narrowest dimension.

4. The human interface device of claim 3 wherein the housing is sized to fit atop of an average human wrist and includes a wrist strap for attaching the housing to the wrist in a manner of a wristwatch.

5. The human interface device of claim 3 wherein the housing provides a frame surrounding the graphics display screen to support the graphics display screen face upward and parallel to the surface during use.

6. The human interface device of claim 1 further including a collimator collimating the light from a fan-shaped acquisition region in the light-sensing plane onto the at least two photodetectors, the fan-shaped acquisition region having its widest dimension aligned along the light-sensing plane.

7. The human interface device of claim 1 wherein the model includes corrections for angular sensitivity variation of the at least two photodetectors within the light-sensing plane and angular sensitivity variations of the light source light output within the light-sensing plane.

8. A human interface device comprising:
   a housing supporting a graphics display screen positionable against a surface;
   at least two photodetectors supported by the housing to receive light along a light-sensing plane extending away from the housing over an area offset from the housing, the at least two photodetectors each receiving light from over a common region of the light-sensing plane and each producing a light-strength signal being a function of light received over the common region of the light-sensing plane;
   at least one light source to project light along the light-sensing plane; and
   an electronic computer communicating with the at least two photodetectors and the at least one light source and executing a program stored in non-transitory medium to:
   (1) independently measure the light strength signals reflected from the at least one light source off a finger within the light-sensing plane;
   (2) apply values of the light strength signals to a model converting strength of the light strength signals t to orthogonal coordinates defining points within the light-sensing plane;
   (3) control an output on the graphics display screen according to the coordinates;
   further including a collimator collimating the light from a fan-shaped acquisition region in the light-sensing plane onto the at least two photodetectors, the fan-shaped acquisition region having its widest dimension aligned along the light-sensing plane; and
   wherein the fan-shaped acquisition region has a width measured in the light-sensing plane with at least 20 times a height of the fan-shaped acquisition region measured perpendicularly to the light-sensing plane.

9. The human interface device of claim 8 the collimator forms the light from the at least one light source into a fan shape having its widest dimension aligned along the light-sensing plane.

10. The human interface device of claim 9 wherein the fan shape has a width measured in the light-sensing plane with at least 20 times the height of the fan measured perpendicularly to the light-sensing plane.

11. The human interface device of claim 1 wherein the output controls an image location on the graphics display screen.

12. The human interface device of claim 11 wherein a motion of the image has a same orientation as motion of the finger within the light-sensing plane.

13. The human interface device of claim 1 wherein the output controls a virtual keyboard for entering characters on the graphics display screen.

14. The human interface device of claim 1 wherein the electronic computer further executes the program to monitor the measured light strength signals to deduce a presence or absence of the finger to control output on the graphics display according to a presence or absence of the finger in the light-sensing plane.

15. The human interface device of claim 1 wherein the electronic computer further executes the program to determine a background signal level when the finger is not within the light-sensing plane and compensating the measured light strength signals according to the measured background signal level.

16. The human interface device of claim 1 wherein the light source is modulated and the measured light strength signals from the at least two photodetectors are demodulated to reject ambient light not subject to the modulation.

17. The human interface device of claim 16 wherein the electronic computer further executes a stored program to change a modulation duty cycle of the light source to decrease power when a finger presence is not detected.

18. The human interface device of claim 16 wherein the electronic computer further executes the program to receive the measured light strength signals during a predefined path of motion of the finger within the light-sensing plane to calibrate the model.

19. The human interface device of claim 18 wherein the model is calibrated to an arbitrary area defined by a specified path of motion of the finger.

* * * * *